INVENTOR.
JOHN J. LOTWIS JR.
ATTORNEY

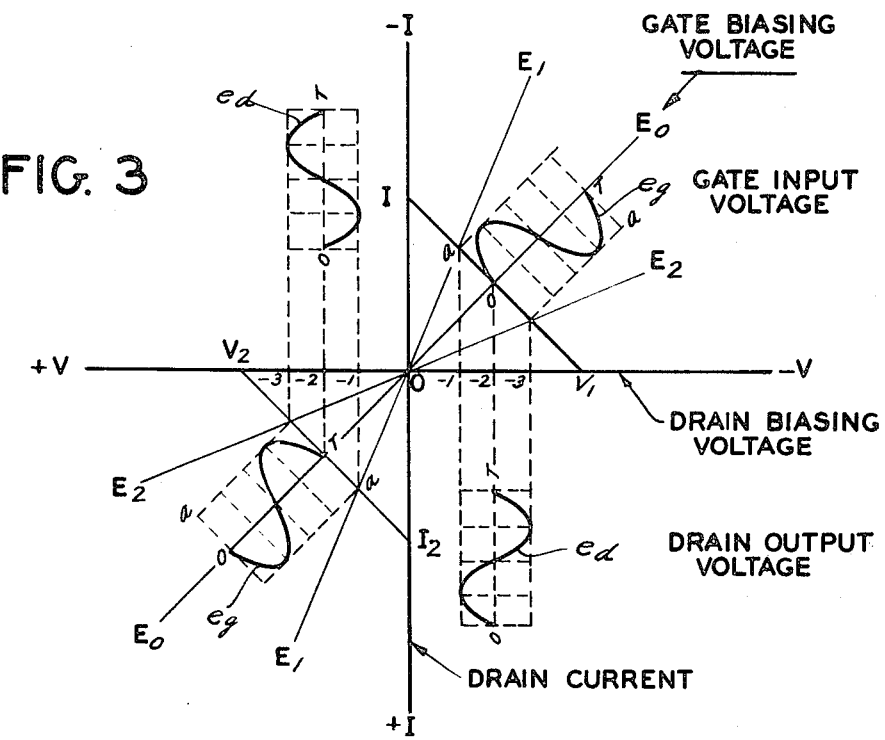
FIG. 3
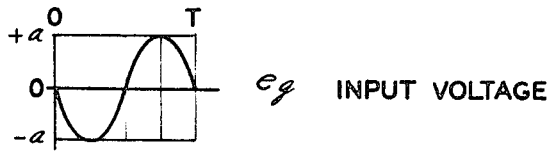
FIG. 3A  $e_g$  INPUT VOLTAGE
FIG. 3B  $e_d$  OUTPUT VOLTAGE WITH NEGATIVE DRAIN BIAS -V
FIG. 3C  $e_d$  OUTPUT VOLTAGE WITH POSITIVE DRAIN BIAS +V
*INVENTOR.*
JOHN J. LOTWIS JR.
BY
*ATTORNEY*

United States Patent Office 3,444,466
Patented May 13, 1969

3,444,466
APPARATUS FOR DETECTING THE LEVEL OF AN UNKNOWN VOLTAGE RELATIVE TO THE LEVEL OF A KNOWN VOLTAGE
John J. Lotwis, Jr., New Milford, N.J., assignor to The Bendix Corporation, a corporation of Delaware
Filed Mar. 10, 1965, Ser. No. 438,543
Int. Cl. G01r 17/02, 19/22
U.S. Cl. 324—98                  6 Claims

ABSTRACT OF THE DISCLOSURE

A voltage level detector including means for providing a summation voltage having a polarity in accordance with the difference between known and unknown voltages. A current flow control device is connected at its input to an A.C. voltage source and is biased by the summation voltage and by a D.C. voltage to provide an output having a phase relation to the A.C. input, and which output is detected by comparing the phase angles of the input and output voltages.

---

This invention relates to a voltage level detector and more particularly to a level detector which can distinguish between unknown voltages having a positive, zero or a negative level, and can furthermore determine if the level of an unknown voltage is above, equal to, or below the level of some preselected reference voltage.

Devices which can compare an unknown voltage to some predetermined reference voltage enjoy a wide use in many electronic applications and in particular in computer systems involving voltage analog to digital converters. In these devices, it may be necessary, for example, to compare the unknown output voltages of a digitizing device to a reference voltage by applying the unknown and reference voltages as inputs to a comparing means and obtaining voltage outputs representing the difference between the applied voltages, with these voltage outputs being functionally employed in the converter system.

Heretofore, devices which have been used to accomplish this task, such as comparators or differential amplifiers, have employed vacuum tubes or solid state means such as conventional transistors. Where conventional bipolar transistors of the NPN or PNP type have been used, the sensitivity of the comparing device has been limited. The limitation is caused by the interdependence of the input (base to emitter) circuit and the output (emitter to collector) circuit of the bipolar transistor and the inherent low input impedance of these devices. When diodes have been employed, the lack of a distinct difference between forward and reverse impedance has contributed to the limitation on the sensitivity of the comparing device.

In order to provide a voltage level detector with increased sensitvity, the means embodied in the present invention employs a field effect transistor. The field effect transistor is a unipolar solid state device having source, gate and drain elements, with these elements functioning as hereinafter explained. The field effect transistor may be considered as being a structure containing a circuit path whose resistance is effected by the application of a transverse electric field. Such a device has an inherently high input impedance, and is operationally described in Electronics for Scientists, Holstadt et al., W. A. Benjamin, Inc., 1963, page 148. The device used in the present invention may be of the type 2N2499 (P channel) manufactured by Texas Instruments Incorporated, Dallas, Tex., or an equivalent device.

The operation of the voltage level detector embodied in the present invention is based on a unique characteristic of the field effect transistor to provide an output voltage either in phase or out of phase with its input voltage in a manner as will be illustrated with reference to the figures herein. It will be shown that if an unknown voltage is less in magnitude than a reference voltage, the summation of the two, which is supplied as a biasing voltage to the drain element of the field effect transistor, will be a negative value, and effect the field transistor so that its input and output voltages will be out of phase. When the magnitude of the unknown voltage exceeds the magnitude of the reference voltage, the summation voltage which biases the drain element of the field effect transistor will become positive, and the input and output voltages of the field effect transistor will be shown to be in phase. When the unknown voltage and reference voltage are equal in magnitude, a theoretical zero summation will result with no biasing voltage being applied to the drain element of the field effect transistor and no output resulting therefrom. Due to an electrostatic effect caused by the arrangement of the components included in the field effect transistor, a stray voltage designated as the "feedthrough" voltage is present, hence making the ultimate zero summation unobtainable. To compensate for this, a voltage equal in magnitude but opposite in phase to the feedthrough voltage is applied through circuitry embodied in the present invention, thus acting to increase the sensitivity of the voltage level detector described herein.

The sensitivity of present voltage level detectors using solid state devices and a minimum of circuitry is in the nature of one millivolt. Using the means embodied in the present invention, and which means will be more fully described in reference to the figures herein, a sensitivity in the nature of thirty-five microvolts has been obtained.

Therefore, it is an object of this invention to provide means to detect the level of an unknown voltage.

It is another object of this invention to provide means to detect whether the level of an unknown voltage is positive, zero or negative relative to the level of a reference voltage.

It is another object of this invention to provide means to determine if the level of an unknown voltage is above, equal to, or below the level of some predetermined reference voltage.

It is another object of this invention to provide means to detect the level of an unknown voltage, said means having an increased sensitivity as compared to other voltage level detection means.

It is another object of this invention to provide a voltage level detector employing the characteristics of a field effect transistor, and to compensate for the feedthrough effects of the field effect transistor in order to increase the sensitivity of the voltage level detector.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings:

FIGURE 3 is a graphical illustration of the linear portion of several of the characteristic curves shown in FIGURE 2, extended to include both positive and negative values of drain biasing voltage and drain current, with field effect transistor input and output sinusoidal voltages, as generated by the network of FIGURE 1, projected thereon.

FIGURE 3A is a graphical illustration of the sinusoidal input voltage supplied to the field effect transistor of FIGURE 1 as shown in the upper right and lower left quadrants of the graphical illustration of FIGURE 3, with these input voltages plotted on a common horizontal axis.

FIGURE 3B is a graphical illustration of the sinusoidal output voltage of the field effect transistor of FIGURE 1 for conditions of a negative drain biasing voltage as shown in the lower right quadrant of the graphical illustration of FIGURE 3, plotted on the common horizontal axis of FIGURE 3A.

FIGURE 3C is a graphical illustration of the sinusoidal output voltage of the field effect transistor of FIGURE 1 for conditions of a positive drain biasing voltage as shown in the upper left quadrant of the graphical illustration of FIGURE 3, plotted on the common horizontal axis of FIGURES 3A and 3B.

Figure 1:
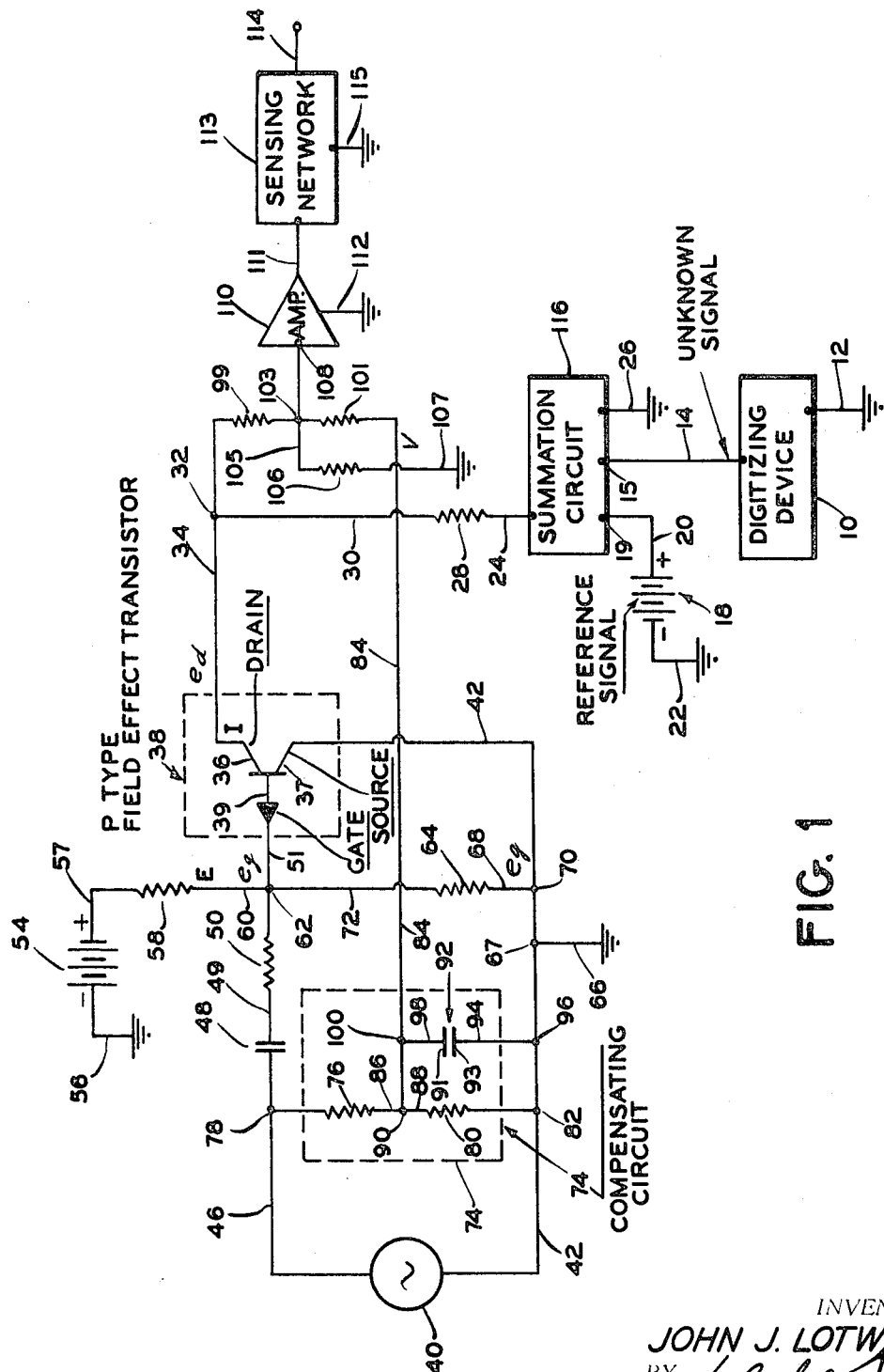
FIGURE 1 is a schematic wiring diagram showing an electrical network including a novel means for detecting the level of an unknown voltage.

In reference to FIGURE 1, the means embodied in the present invention may, for purposes of illustration, be employed in a voltage analog to digital converter system employing a digitizing device designated by the numeral 10 which may be of a conventional type used to generate voltages across the output conductors 12–14 thereof in proportion to a preselected digital code. In order to make these voltages functional, it is first necessary to establish their level relative to some preselected reference voltage. To accomplish this, the voltages as taken across output conductors 12–14 of the digitizing device 10 are coupled to a summation circuit 16, which may be of a type such as that shown on page 354, Electronics for Scientists, infra, by the output conductor 14 being connected to an input terminal 15 of the summation circuit 16 and the output conductor 12 being connected to ground. Since the levels of these voltages are unknown, the means embodied in the present invention will compare these voltages with the voltage generated by a constant direct current reference source which may be a battery 18, with the voltage generated by the battery 18 having a known level. The battery 18 provides a reference voltage with a known level across output conductors 20–22 thereof, with this reference voltage coupled to an input of the summation circuit 16 by having the positive terminal of the battery 18 coupled to an input terminal 19 of the summation circuit 16 through the output conductor 20, and a negative terminal coupled to ground through the conductor 22. The voltage output of the summation circuit 16 taken across an output conductor 24 and a grounded output conductor 26 will therefore represent the difference in level between a particular voltage which may be developed by the digitizing means 10 and the reference voltage generated by the battery 18. The voltage level difference may then be made functional by applying it to appropriate circuitry as will be next described.

The voltage at the output conductor 24 of the summation circuit 16 is coupled through a load resistor 28 and a conductor 30, joining a conductor 34 at a point 32, to an output or drain element 36 of a field effect transistor 38. The field effect transistor 38 also has an input or source element 37 and a P-type gate element 39. By applying the voltage provided by the output of the summation circuit 16 to the drain element 36 of the field effect transistor 38 in the aforenoted manner, a bias voltage V is thus applied to the drain element 36 of the field effect transistor 38. This drain bias voltage V may be either positive, zero, or negative depending on whether the level of the voltage generated by the digitizing device 10 is greater, equal to, or less than the level of the reference voltage supplied by the battery 18. An analysis of the circuit shown in FIGURE 1 for each of the above noted conditions of polarity of drain bias voltage V applied to the drain element 36 of the field effect transistor 38 will be hereinafter provided.

A conventional source of alternating current 40 is coupled to the field effect transistor 38 by an output conductor 42 of the alternating current source 40 being connected to the source element 37 of the field effect transistor 38, and the output conductor 42 also being connected to a grounded conductor 66 joining the conductor 42 at a point 67. Another output conductor 46 of the alternating current source 40 is coupled through a capacitor 48, a conductor 49, a resistor 50, and a conductor 51 to the gate element 39 of the field effect transistor 38, thus applying an alternating current input voltage $e_g$ across the gate element 39 and the source element 37 of the field effect transistor 38. The capacitor 48 is provided to isolate the steady state component of the alternating current source 40 and to allow passage to the field effect transistor 38 of only the transient component thereof. The resistor 50 is provided to give noise immunity to the signal thus passing to the field effect transistor 38.

The gate element 39 of the field effect transistor 38 is biased by the voltage output of a constant source of direct current or battery 54. The negative terminal of the battery 54 is connected to a grounded conductor 56, and the positive terminal thereof is connected through a resistor 58 and a conductor 60 to the gate element 39 of the field effect transistor 38 by the conductor 60 joining the conductor 51 leading to the gate element 39 at a point 62. A gate biasing voltage E is thus provided across the output conductors 56–57 of the direct current source 54. The circuit is effected by the resistor 58 and by a resistor 64 which is connected to the output conductor 42 of the alternating current source 40 at a point 70, and to the conductor 51 leading to the gate element 39 of the field effect transistor 38 at the point 62. The ratio of the resistor 58 to the resistor 64 is such that the field effect transistor 38 will operate at a predetermined gate biasing voltage E as determined by the direct current source or battery 54.

It is also necessary that the field effect transistor 38 operate in its "non-pinched off" region. The non-pinched off region of the field effect transistor 38, as graphically illustrated in FIGURE 2, may be defined as the area on a characteristic curve of the field effect transistor 38 where an increase in drain biasing voltage V provided by the output of the summation network 16 provides a proportionate increase in drain current I. The reason for operating the field effect transistor 38 in the non-pinched off region is, therefore, to insure that the drain current I at the drain element 36 is proportional to the drain biasing voltage V applied to the drain element 36, and hence proportional to an output voltage $e_d$ at the drain element 36 of the field effect transistor 38.

Due to the inherent capacitive effect caused by the interconnecting arrangement of the elements comprising the field effect transistor 38, an undesirable voltage designated as a "feedthrough" voltage is present. This feedthrough voltage will, unless compensated for, detract from the sensitivity of the voltage level detector embodied in the present invention.

In consideration of this feedthrough voltage, a compensating circuit generally designated by the numeral 74 is included in the circuitry shown in FIGURE 1. The compensating circuit 74 includes a resistor 76 coupled to the output conductor 46 of the alternating current source 40 at a point 78 and a resistor 80 coupled to the output conductor 42 of the alternating current source 40 at a point 82. The resistors 76 and 80 are coupled to an output conductor 84 of the compensating circuit 74 by conductors 86 and 88 joining the conductor 84 at a point 90. Also included in the compensating circuit 74 is a capacitor 92 having an input plate 91 joined to the output conductor 84 of the compensating circuit 74 by a conductor 98 joining the output conductor 84 at a point 100, and having an output plate 93 coupled to the output conductor 42 of the alternating current source 40 by a conductor 94 joining the output conductor 42 at a point 96. The resistor 76, the resistor 80 and the capacitor 92 are arranged so that the compensating circuit 74 provides a voltage across the output conductors 66–84 which is equal in magnitude but opposite in phase to the feedthrough voltage generated by the field effect transistor 38, thus compensating for a cause of insensitivity in the level detector embodied in the present invention. The ratio of the resistor 76 to the resistor 80 imparts the correct magnitude to the voltage generated by the compensating circuit 74, and the capacitor 92 provides for the necessary phase adjustment.

The output $e_d$ of the field effect transistor 38 taken across output conductors 34–66, and the output of the compensating circuit 74 taken across output conductors 84–66 are summed through the summing resistors 99 and 101 at the summation point 103. The resultant voltage at the summation point 103 is connected through a conductor 105 and a resistor 106 to a grounded conductor 107, and is further connected to an input terminal 108 of the amplifier 110. The amplifier 110 may be of the conventional high gain, alternating current type which has an output voltage across an output conductor 111 and a grounded output conductor 112 having a relationship to the difference in levels between a particular voltage generated by the digitizing means 10 and the constant reference voltage generated by the battery 18. This voltage may further be coupled by the output conductor 111 of the amplifier 110 to a utilizing device such as a sensing network 113 having an output conductor 114 and a grounded input-output conductor 115. The sensing network 113 may determine the magnitude and the phase relationship of this voltage, and the voltage so determined may be functionally utilized.

*Field effect transistor characteristics*

The aforenoted relationship between the output voltage at the conductors 111–112 of the amplifier 110 and the difference in levels between the unknown voltage supplied by the digitizing device 10 and the reference voltage supplied by the battery 18, which difference is represented by the output voltage of the summation network 16 across the output conductors 24–26, can best be explained by examining the characteristics of a field effect transistor.

The operation of the voltage level detector embodied in the present invention is based upon the features of a field effect transistor, such as the field effect transistor 38 shown in FIGURE 1, which provide that the output signal $e_d$ of the field effect transistor 38 taken across the output conductors 34–66 can be in phase or out of phase with the input signal $e_g$ supplied to the field effect transistor 38 by the output conductors 42–46 of the alternating current source 40. It should also be noted that this phase relationship depends upon the polarity of the drain biasing voltage V applied to the drain element 36 of the field effect transistor 38 by the output of the summation network 16 across the output conductors 24–26.

This phenomenon can best be illustrated by referring to a graphical illustration of the characteristics of a field effect transistor such as the field effect transistor 38 shown in FIGURE 1 and utilized in the present invention. Typical field effect transistor characteristic curves are shown in FIGURE 2 and FIGURE 3, and may be such as shown in FIGURE 11 of "Field Effect Transistor Theory and Applications" published by Texas Instruments, Inc., Dallas, Tex.

Figure 2:
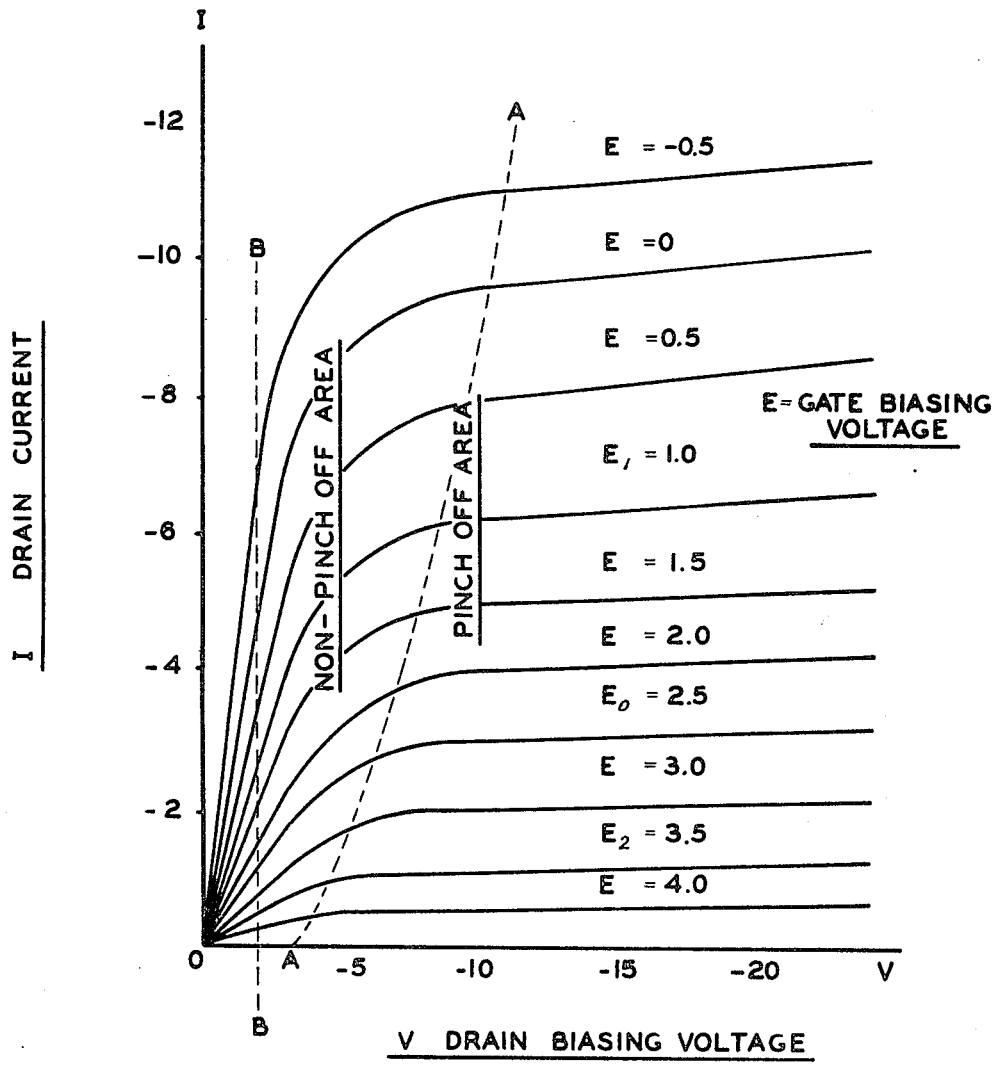
FIGURE 2 is a graphical illustration showing the characteristic curves of a field effect transistor as shown in the schematic wiring diagram of FIGURE 1, for negative values of drain biasing voltage and drain current.

In reference to FIGURE 2, the characteristic curves of a P-type field effect transistor such as the field effect transistor 38 utilized in the present invention are plotted on rectangular coordinates, with the abscissas of these curves plotted along an axis OV and representing various drain biasing voltages V, which may be applied to the drain element 36 of the field effect transistor 38 from the summation network 16 through the output conductors 24–26, the resistor 28, the conductor 30, and the conductor 34 as shown in FIGURE 1. The corresponding ordinates of the characteristic curves shown in FIGURE 2 are plotted along an axis OI and represent the various values of current I at the drain element 36 of the field effect transistor 38 resulting from applying the drain biasing voltage V through the load resistor 28 as shown in FIGURE 1. The plot of drain current I and drain biasing voltage V, therefore, provides a family of curves, with each of the curves representing a constant gate biasing voltage E, or that voltage supplied to the gate element 39 of the field effect transistor 36 from the direct current source or battery 54 through the resistor 58, the conductor 60, and the conductor 51, as shown in FIGURE 1. The characteristic curves of FIGURE 2 thus show the variation of drain current I with drain biasing voltage V for a particular value of gate biasing voltage E.

The dotted line A—A shown in FIGURE 2 delineates the "pinch off" area of the characteristic curves from the "non-pinch off" area, with the "non-pinch off" area being that portion of the graphical representation of FIGURE 2 at which an increase in drain biasing voltage V will produce a proportionate increase in drain current I. As viewed in FIGURE 2, the "non-pinch" off area is to the left of the dotted line A—A with the area to the right, the "pinch off" area, showing little or no increase in drain current I for an increase in drain biasing voltage V. It is significant to note that the characteristic curves of a field effect transistor such as the field effect transistor 38 are linear in the lower ranges of drain biasing voltage V, as indicated by the portion of the characteristic curves to the left of line B—B as viewed in the graphical representation of FIGURE 2. It is evident that improved sensitivity in a voltage level detector, as provided by the means embodied in the present invention, is highly desirable when the level detector is operating in a low range of drain biasing voltage V, since it is at these low voltages that any prevailing insensitivity has its greatest effect. For this reason, the voltage level detector embodied in the present invention will be hereinafter analyzed in relation to the linear portion of its characteristic curves, or that portion of the characteristic curves to the left of the line B—B shown in the graphical representation of FIGURE 2.

With the characteristics of the field effect transistor 38 shown in FIGURE 1 established by the curves shown in the graphical representation of FIGURE 2, a more detailed analysis of the operation of the field effect transistor 38 in relation to the objects of the present invention may be achieved.

This analysis may be best accomplished by first referring generally to FIGURE 3. FIGURE 3 is a graphical representation of the linear portion of several of the characteristic curves shown in FIGURE 2, which represent the gate biasing voltage E, with these curves designated in FIGURE 2 and FIGURE 3 as $E_0$, $E_1$, and $E_2$. For illustrative purposes, the gate biasing voltage having a magnitude $E_0$ has been chosen as the operating voltage, with the gate biasing voltage $E_1$ and the gate basing voltage $E_2$ shown in relation to the operating gate biasing voltage $E_0$. By comparing FIGURE 3 with FIGURE 2, it may be seen from the relative position of the curves representing the gate biasing voltage E that the gate biasing voltage $E_1$ is less positive than the gate biasing voltage $E_0$, and the gate biasing voltage $E_2$ is more positive than the gate biasing voltage $E_0$. The graphical representation shown in FIGURE 3 has been extended to include both positive and negative values of the drain biasing voltage V and the drain current I. A voltage scale ranging from +3 to zero to —3 has been plotted along the axis of abscissas VV of the graphical representation of FIGURE 3, in order to illustrate the direction of increase and decrease for the drain biasing voltage V.

A load line $V_1I_1$ is superimposed on the graphical representation of FIGURE 3 with the line $V_1I_1$ intercepting the axis of ordinates II representing the drain current I at a point $I_1$, and intercepting the axis of abscissas VV representing the drain biasing voltage V at a point $V_1$. The point $V_1$ defines a particular drain biasing voltage which may be supplied to the drain element 36 of the field effect transistor 38 from the summation network 16 as shown in FIGURE 1. The point $I_1$ represents the current at the drain element 36 due to the action of the particular drain biasing voltage $V_1$ with the load resistor 28 as shown in FIGURE 1. The line $V_1I_1$, therefore, is the locus of the possible operating points for the field effect transistor 38 shown in FIGURE 1 when a negative drain biasing voltage $V_1$ is applied to the drain element 36 of the field effect transistor 38 by the summation network 16 as shown in FIGURE 1. In a similar manner, the load line $V_2I_2$ is established, with the load line $V_2I_2$ being the locus of all operating points for the field effect transistor 38 when a positive drain biasing voltage $V_2$ is applied to the drain element 36 thereof from the summation network 16 as shown in FIGURE 1.

The field effect transistor characteristic curves shown in FIGURE 3, with the operating points determined by the lines $V_1I_1$ and $V_2I_2$ as heretofore described, may be utilized to graphically analyze the relationship between the input voltage $e_g$ supplied to the field effect transistor 38 by the output conductors 42-46 of the alternating current supply 40 and the output voltage $e_d$ of the field effect transistor 38 taken across the output conductors 34-66 thereof as shown in FIGURE 1. As will be hereinafter shown, such a relationship is based on the polarity of the drain biasing voltage V supplied to the drain element 36 from the summation network 16. This relationship will be shown by a graphical analysis such as that commonly made for vacuum tubes as illustrated in Applied Electronics, Gray, John Wiley and Sons, Inc., Second Edition, 1954, p. 401, and may be extended by analogy to the field effect transistor 38 embodied in the present invention, wherein the drain element 36 is equivalent to a vacuum tube plate, the gate element 39 is equivalent to a vacuum tube cathode, and the source element 37 is equivalent to a vacuum tube grid. Such an analysis will be made for each of the conditions of polarity of the drain biasing voltage V.

*Negative drain biasing voltage*

Referring to FIGURE 1, if the level of the voltage output of the digitizing device 10, as taken across the output conductors 12-14, is less than the level of the reference voltage supplied by the direct current source or battery 18 through the output conductors 20-22, the output voltage of the summation network 16 taken across the output conductors 24-26 will be negative. A negative drain biasing voltage $V_1$ will thus be applied to the drain element 36 of the field effect transistor 38 through the output conductor 24, the load resistor 28, the conductor 30, and the conductor 34. The field effect transistor 38, therefore, will be operating in the area shown in the upper right quadrant of the graphical illustration as viewed in FIGURE 3.

In reference to FIGURE 3, the operating gate biasing voltage $E_0$ is supplied by the battery 54 to the gate element 39 of the field effect transistor 38 through the output conductors 56-57, the resistor 58, the conductor 60 and the conductor 51 as shown in FIGURE 1. The operating points of the circuit are defined by the load line $V_1I_1$ as heretofore described. The input voltage $e_g$ supplied by the alternating current source 40 through the output conductors 42-46 shown in FIGURE 1 is represented by a one cycle sinusoidal excursion along the load line $V_1I_1$, starting at time 0 and ending at time $t$ as shown in FIGURE 3. The amplitude of each half cycle of the input voltage $e_g$ is represented as $a$. The first half cycle of the gate input voltage $e_g$ travels toward the gate biasing voltage $E_1$. Since $E_1$ is less positive than $E_0$, as may be seen by comparing FIGURE 2 with FIGURE 3, the first half cycle of the input voltage $e_g$ may be represented as negative going as shown in FIGURE 3A. Similarly, as the next half cycle of the input voltage $e_g$ travels toward $E_2$, $E_2$ being more positive than $E_0$, as seen by comparing FIGURE 2 and FIGURE 3, the second half cycle of the input voltage $e_g$ may be represented as positive going as shown in FIGURE 3A.

The input voltage $e_g$, thus graphically represented, is projected onto the drain biasing voltage scale shown on the axis of abscissas VV of the graphical illustration of FIGURE 3. This projection provides a graphical depresentation of the output voltage $e_d$ taken across the output conductors 34-66 of the field effect transistor 38 shown in FIGURE 1. With reference to the output voltage $e_d$ as graphically illustrated in the lower right quadrant of FIGURE 3, the first half cycle thereof travels from a magnitude of $-2$ to a magnitude of $-1$, as measured on the drain biasing voltage scale, and hence is positive going as shown in FIGURE 3B. The second half cycle of the output voltage $e_d$ moves from a $-2$ to a $-3$ magnitude, thus becoming more negative as graphically represented in FIGURE 3B.

It may therefore be seen by comparing FIGURES 3, 3A and 3B that when a negative drain biasing voltage $V_1$ is applied to the drain element 36 of the field effect transistor 38 by the output of the summation network 16, as shown in FIGURE 1, the output voltage $e_d$ of the field effect transistor 38 is out of phase with the input voltage $e_g$ supplied to the field effect transistor 38 by the alternating current source 40, with the output voltage $e_d$ reaching a positive peak as the input voltage $e_g$ reaches a negative peak. The out of phase condition for the input and output voltages of the transistor 38 may thus be said to occur when an unknown voltage has a lower level than a reference voltage, with the summation of the two voltages providing a negative voltage to bias the drain element 36 of the field effect transistor 38.

*Positive drain biasing voltage*

Referring to FIGURE 1, if the output of the digitizing device 10 taken across the output conductors 12-14 is greater than the reference voltage supplied by the direct current source or battery 18 through the output conductors 20-22, the output of the summation network 16 across the otput conductors 24-26 will be positive. A positive drain biasing voltage $V_2$ will thus be applied to the drain element 36 of the field effect transistor 38 through the output conductor 24, the load resistor 28, the conductor 30, and the conductor 34 as shown in FIGURE 1. The field effect transistor 38, therefore, will be operating in the area shown in the lower left quadrant of the graphical representation as viewed in FIGURE 3.

In reference to FIGURE 3, the input signal $e_g$, supplied to the field effect transistor 38 by the alternating current source 40 through the output conductors 42-46 shown in FIGURE 1, is represented by a one-cycle sinusoidal excursion along the load line $V_2I_2$. The operating points of the circuit under the condition of a positive drain biasing voltage having a magnitude $V_2$ are defined by the line $V_2I_2$ as heretofore explained. The amplitude of each half cycle of the input voltage $e_g$ is represented as $a$. The first half cycle of the input voltage $e_g$ travels toward the gate biasing voltage $E_1$ and the second half cycle travels toward the gate biasing voltage $E_2$. Since the gate biasing voltage $E_1$ is less positive than the gate biasing voltage $E_0$, and the gate biasing voltage $E_2$ is more positive than the gate biasing voltage $E_0$, the input voltage $e_g$ is negative going during the first half cycle and positive going during the second half cycle, as may be graphically represented by FIGURE 3A, with the input voltage $e_g$ being thus uneffected by the polarity of the drain biasing voltage V.

The input voltage $e_g$, graphically represented for conditions of a positive drain biasing voltage $V_2$ in the lower left quadrant of the graphical representation as viewed in FIGURE 3, is projected onto the drain biasing voltage scale as shown along the axis of abscissas VV of the graphical representation of FIGURE 3. This projection provides a graphical representation of the output voltage $e_d$ taken across the output conductors 34–66 of the field effect transistor 38 shown in FIGURE 1. With reference to the output voltage $e_d$ as graphically shown in the upper left quadrant of FIGURE 3, the first half cycle thereof travels from a magnitude of +2 to a magnitude of +1, as measured on the drain biasing voltage scale and hence is negative moving, as shown in FIGURE 3C. The second half of the output voltage $e_d$ travels from a magnitude of +2 to a magnitude of +3 thus moving in a positive direction, as graphically represented in FIGURE 3C. It may therefore be seen by comparing FIGURES 3, 3A and 3C that when a positive biasing voltage $V_2$ is applied to the drain element 36 of the field effect transistor 38, as shown in FIGURE 1, the output voltage $e_d$ taken across the output conductors 34–66 of the field effect transistor 38 is in phase with the input voltage $e_g$ supplied to the field effect transistor 38 by the alternating current source 40 through the output conductors 42–46 of the alternating current source 40, with both input and output voltages reaching their positive and negative peaks at the same time. The in-phase condition for the input and output voltages of the transistor 38 may thus be said to occur when the unknown voltage generated by the digitizing device 10 has a higher level than the reference voltage generated by the direct current source or battery 18 with the summation of the two voltages providing a positive biasing voltage to the drain element 36 of the field effect transistor 38.

*Zero drain biasing voltage*

When the voltage generated by the digitizing source 10 is equal in level to the reference voltage generated by the direct current source or battery 18, the voltage detected at the output conductors 24–26 of the summation circuit 16 will be equal to zero. Under these conditions, there will be no biasing voltage applied to the drain element 36 of the field effect transistor 38 and hence no output voltage will be generated across the output conductors 34–66 of the field effect transistor 38 as may be seen with reference to FIGURE 1. Although theoretically no output voltage will result from the field effect transistor 38 under conditions where no bias voltage is applied to the drain element 36, such a situation will not occur due to the feedthrough voltage resulting from the arrangement of the elements of the field effect transistor 38, and the resulting electrostatic effect as heretofore noted. To compensate for this feedthrough voltage, the compensating circuit 74 including the resistor 76, the resistor 80, and the capacitor 92 has been included in the circuit shown in FIGURE 1 to counteract the feedthrough signal and to provide a signal equal in magnitude but opposite in phase to the feedthrough signal. By employing such a compensating circuit, a high level of sensitivity can be achieved for the voltage level detector embodied in the present invention.

*Operation*

The voltage level detector embodied in the present invention utilizes the unique characteristics of a field effect transistor to provide a highly sensitive means for detecting the level of an unknown voltage. The field effect transistor 38 shown in FIGURE 1 is supplied with a voltage input from the alternating current source 40. The voltage output of the field effect transistor 38 may be either in phase or out of phase with the voltage input supplied by the alternating current source 40, depending upon the polarity of a biasing voltage suppled to the drain element 36 of the field effect transistor 38 as shown in FIGURE 1.

This drain biasing voltage is generated by a summation circuit 16 having as one input a known reference voltage provided by the battery 18 and having as another input the output voltages of an unknown level provided by a digitizing device 10. The output voltage generated by the summation circuit 16, therefore, may be either positive, zero, or negative, depending upon the level of the known reference voltage as compared to the level of these unknown voltages provided by the digitizing device 10.

The characteristics of the field effect transistor 38 are such that if the biasing voltage supplied to the drain element 36 of the field effect transistor 38 by the summation circuit 16 is negative, the input signal supplied to the transistor 38 by the alternating current source 40 will be out of phase with the output signal of the field effect transistor 38. If the biasing voltage supplied by the summation circuit 16 is positive, the input signal to the field effect transistor 38 will be in phase with the output signal. When a zero bias voltage occurs, no output voltage will be generated at the output conductor of the field effect transistor 38. Since the arrangement of the elements comprising the field effect transistor 38 causes a feedthrough voltage to be generated by inter-element capacitive action, with this feedthrough voltage being in degradation of the sensitivity of the level detector embodied in the present invention, a compensating circuit has been included to reduce the effects of the feedthrough voltage and hence increase the sensitivity of the level detection means.

The output voltage provided by the field effect transistor 38, whether it be in phase or out of phase with the input voltage provided by the alternating current source 40, or whether it be zero due to the fact that no bias voltage is supplied to the drain element 36, may be coupled to a utilizing means such as the sensing network 113 where its magnitude and its phase relationship to the input voltage from the alternating current source 40 may be determined and the voltage thus determined being functionaly employed in the system.

The means employed in the present invention employs unique circuitry to utilize the above noted characteristics of a field effect transistor. The combination of the field effect transistor and this unique circuitry provides a highly sensitive device which should enjoy wide application in the electronics field, and particularly in areas where voltage analog to digital computer systems and the like require that voltages of an unknown level be referenced to a known voltage level before they can be functionally employed in a system.

What is claimed is:

1. Apparatus to detect an unknown voltage level relative to a known voltage level comprising means to generate a first voltage having said unknown level, means to generate a second voltage having said known level, means operably connected to said first and second voltages to provide a summation voltage having a polarity depending on the difference between the levels of said first and second voltages, a field effect transistor having gate, source and drain elements, said summation voltage operably connected to the drain element to provide a first biasing voltage to said field effect transistor, means to generate a sinusoidal voltage, said sinusoidal voltage operably connected across the gate and source elements to provide an input to said field effect transistor, a direct current source, the output voltage of said direct current source operably connected to the gate element to provide a second biasing voltage to said field effect transistor, the output voltage at the drain element of said field effect transistor having a phase relationship to said input voltage depending upon the polarity of said summation voltage, and means to detect the level of said first voltage relative to the level of said second voltage by comparing the phase angles of said input and output voltages.

2. Apparatus to detect an unknown voltage level relative to a known voltage level comprising means to generate a first voltage of an unknown level, means to generate a second voltage of a known level, first summing means to sum said first and second voltages to provide a summation voltage having a polarity depending on the difference in levels between said first and second voltages, a current flow control device having gate, source and drain elements, said summation voltage operably connected to said drain element to bias said control device, a direct current source, the output voltage of said direct current source operably connected to said gate element to bias said control device, means to generate a sinusoidal voltage, said sinusoidal voltage operably connected to the gate and source elements to provide an input voltage to said control device, said control device operating to provide an output voltage at said drain element having a phase relation to said input voltage depending upon the polarity of said summation voltage, a feedthrough voltage electrostatically produced by the arrangement of said gate, source and drain elements of said control device, said feedthrough voltage acting to degrade the sensitivity of said control device, circuit means connected to the sinusoidal voltage means and to the control device and responsive to the sinusoidal voltage to provide a voltage to compensate for said feedthrough voltage, second summing means to sum said control device output voltage and said compensating circuit output voltage to provide a resultant output voltage, said resultant output voltage having a phase relationship to said input voltage depending on the polarity of said summation voltage, and means to detect the level of said first voltage relative to said second voltage by comparing the phase angles of said input and resultant output voltages.

3. Apparatus to detect an unknown voltage level relative to a known voltage level comprising a field effect transistor having gate, source and drain elements, means to generate a first voltage depending upon the difference between said known and unknown levels, said first voltage being operably connected to the drain element to provide a first biasing voltage to said field effect transistor, means to generate a second voltage, said second voltage being operably connected to the gate element to provide a second biasing voltage to said field effect transistor, means to generate a sinusoidal voltage, said sinusoidal voltage being operably connected across the gate and source elements so as to provide an input voltage to said field effect transistor, said first biasing voltage, said second biasing voltage and said input voltage cooperating to provide an output voltage at the drain element of said field effect transistor, a feedthrough voltage provided by the interaction of said gate, source and drain elements in degradation of the sensitivity of said field effect transistor, circuit means operably connected to the sinusoidal voltage means and to the field effect transistor and responsive to the sinusoidal voltage to provide an output voltage to compensate for said feedthrough voltage, means to sum said field effect transistor output voltage and said compensating circuit output voltage to provide a resultant output voltage, said resultant output voltage having a phase relationship to said input voltage depending upon the difference between said known and unknown levels, and means to compare the phase angles of said input and resultant output voltages in order to detect said unknown voltage level.

4. The combination of claim 3 in which said means to generate a first voltage depending upon the difference between said known and unknown levels includes means to generate a voltage having an unknown level, means to generate a voltage having a known level, means to sum said voltages of known and unknown levels to provide a summation voltage, said summation voltage having a polarity depending on the difference between said known and unknown levels, and said summation voltage being said first voltage operably connected as a first biasing voltage to said field effect transistor.

5. The combination defined by claim 3 in which said circuit means operably connected to provide an output voltage to compensate for said feedthrough voltage includes a first resistor, a second resistor operably connected to said first resistor, a capacitor operably connected to said first and second resistors, and said circuit means including said first and second resistors and said capacitor operably connected to said means to generate a sinusoidal voltage so that said circuit means provides an output voltage equal in magnitude but opposite in phase to said feedthrough voltage.

6. Apparatus to detect an unknown voltage level relative to a known voltage level comprising means to generate a first voltage having an unknown level, means to generate a second voltage having a known level, means to generate a third voltage, said third voltage being a summation of said first and second voltages and having a polarity depending upon the difference between said known and unknown levels, a current flow control device having gate, source and drain elements, a source of alternating current, the output voltage of said source of alternating current connected across the gate and source elements to provide an input to said control device, a source of direct current, the output voltage of said source of direct current connected to the gate element to provide a biasing voltage to said control device, said third voltage connected to the drain element to provide another biasing voltage to said control device, said control device operating to provide an output at the drain element having a phase relationship to said input depending upon the polarity of said third voltage, and the level of said first voltage relative to the level of said second voltage detected by comparing the phase angles of said input and output voltages.

References Cited

UNITED STATES PATENTS

| | | | |
|---|---|---|---|
| 2,836,797 | 5/1958 | Ozarow | 307—88.5 |
| 3,281,718 | 10/1966 | Weberg | 307—88.5 |
| 2,939,916 | 6/1960 | Miller | 307—251 XR |

FOREIGN PATENTS

| | | |
|---|---|---|
| 890,390 | 2/1962 | Great Britain. |

RUDOLPH V. ROLINEC, *Primary Examiner.*

E. F. KARL, *Assistant Examiner.*

U.S. Cl. X.R.

324—118, 123